United States Patent Office 3,039,996
Patented June 19, 1962

3,039,996
SYNTHETIC RESINS
Louis L. Ferstandig, El Cerrito, and Philip S. Magee, San Rafael, Calif., assignors to California Research Corporation, San Francisco, Calif., a corporation of Delaware
No Drawing. Filed Sept. 2, 1959, Ser. No. 837,577
5 Claims. (Cl. 260—63)

This invention relates to the production of synthetic resins, and more particularly to improved resins of the polybasic acid-polyhydric alcohol type which are useful in the production of various products, including surface coatings and plastic articles.

It is known that solid synthetic resins of the polybasic acid-polyhydric alcohol type may be produced by reacting a polybasic acid with a polyhydric alcohol with or without various modifying agents such as fatty oils, fatty oil acids, and natural acidic gums. It is known that the introduction of keto groups into these resins can produce products that are especially valuable as protective surface coatings. It is also known generally that the keto groups may be introduced by using as starting materials either a polybasic acid and a ketone polyhydric alcohol or a polyhydric alcohol and a polybasic ketone acid. However, in the latter case extreme difficulties have been encountered because of the inferior quality, extreme brittleness and high acid number of the resin product. Various awkward and expensive expedients have been resorted to in order to improve the quality of the resin product, for example by using in conjunction with the polybasic ketone acid a trihydric alcohol and an aromatic anhydride, together with various gelation-retarding fatty oil acids such as linseed oil acids and Chinawood oil acids. It is an object of the present invention to provide an improved method for avoiding the foregoing difficulties while producing improved polybasic acid-polyhydric alcohol type resins, into which keto groups have been introduced, which do not have the inferior quality of the generally similar prior art products.

In accordance with the present invention, there is provided a process for producing improved resins which comprises reacting a ketopimelic acid with a lower aliphatic glycol in the presence of an esterification catalyst to produce a polyester having keto substituents, and thereafter reacting said polyester with an amine whereby extensive cross-linking through the keto groups is effected. The ketopimelic acid may be 2-ketopimelic acid or 4-ketopimelic acid. The latter is preferred, although 2-ketopimelic acid is very similar and when used in the present process also produces the novel resins described herein. The improved resins are characterized by extensive cross-linking of the keto groups, transparency and solidity. Toughness and flexibility may be varied by varying the type and amount of amine used.

The glycol used may be any glycol operable in the presence of a conventional esterification catalyst to produce a polyester having keto substituents; however, a lower aliphatic glycol, for example ethylene glycol or 1,3-propylene glycol is preferred. The glycol and the ketopimelic acid may be used in approximately equimolar amounts, although a slight molar excess of the glycol is most desirable.

The polyesterification reaction between the ketopimelic acid and the glycol will proceed thermally; however, in such case the reaction is undesirably slow. Therefore, conventional esterification catalysts that will greatly accelerate the reaction should be used, for example, zinc chloride, sulfuric acid, or boron trifluoride.

The amine used may be any amine capable of producing extensive cross-linking of the keto groups in the polyester under the specified reaction conditions; however, especially suitable amines are those selected from the group consisting of diethylene triamine, meta-xylylenediamine, and meta-phenylenediamine. Of these amines, meta-xylylenediamine results in the production of the most superior resin product, and is especially preferred. The amine may be used in an amount from about 0.05 to 0.50 mol of amine per mol of keto groups contained in the polyester.

The polyesterification reaction between the acid and the glycol preferably is accomplished in a stage separate from the reaction of the polyester with the amine, and preferably is accomplished at generally atmospheric pressures and at about from 190° to 300° C., more preferably at about from 200° to 250° C., for a period of time, generally about from 2.5 to 3.5 hours, sufficient to produce a reaction mixture acid number of about from 100 to 145. Temperatures lower than about 190° C. result in impractically low reaction rates, and also contribute to the production of resins of quality inferior to resins produced according to the process of the present invention. Temperatures higher than about 300° C. result in prohibitive decomposition and discoloration of the resulting polyester.

The polyesterification reaction between the acid and the glycol is discontinued while the reaction mixture, substantially comprising a polyester, is a viscous liquid and has the desired acid number. Further reaction would cause undesirable solidification of the polyester, and would result in the inferior quality resins that have been produced by the prior art methods heretofore mentioned. Discontinuance of the reaction while the reaction mixture is a viscous liquid having the desired acid number permits the subsequent reaction with an amine to produce a clear resinous product.

The reaction of the polyester with the amine preferably is accomplished in a second stage at generally atmospheric pressures and at about from 100° to 250° C. This reaction effects extensive cross-linking of the polyester through the keto groups, and can be controlled independently of the polyester formation. It is not necessary to use additional catalyst in the second stage.

In carrying out the process of the present invention the ketopimelic acid and the glycol may be heated in open or closed vessels of glass, enamel, iron, aluminum, etc., to the desired temperature until the desired esterification occurs. An atmosphere of inert gas will tend to produce lighter-colored polyesters, and efficient agitation will materially accelerate the process. Reduced or increased pressures at times may be used if desired. An auxiliary condensing system, such as a short air-cooled reflux condenser, may be used. The esterification may be carried out in the presence of various known solvents for such esterification processes that are inert to the polyester formed and to the starting materials. The reaction between the amine and the polyester may be carried out in any suitable heated vessel.

The following examples will serve to further illustrate the process of the present invention:

*Example 1*

34.8 grams (0.2 mol) of 4-ketopimelic acid, 13.7 grams (0.22 mol) of ethylene glycol, and 0.3 gram of a zinc chloride catalyst were charged to a flask equipped with a reflux condenser and a thermometer. The contents of the flask were heated at atmospheric pressure to a temperature within the range 200° to 250° C., and the temperature was maintained in that range for 3.17 hours, at the end of which time the material remaining in the flask after cooling to room temperature was a viscous liquid, substantially comprising a polyester, having an acid number of 111. 8.06 grams (0.0438 mol) of this viscous liquid were placed in a beaker with 3.11 grams (0.0219 mol) of meta-xylylenediamine. The contents of the beaker were heated to 140° C. at atmospheric pressure and held at about this temperature for four hours, then were heated to 200° C. and held at about this temperature for five hours, after which the contents of the beaker were cooled to room temperature. The material in the beaker was a hard, transparent resinous plastic.

*Example 2*

8.01 grams (0.0435 mol) of the viscous liquid obtained in the first step of Example 1, above, were placed in a beaker with 2.23 grams (0.0217 mol) of diethylene triamine. The contents of the beaker were heated to 140° C. at atmospheric pressure and held at about this temperature for four hours, then were heated to 200° C. and held at about this temperature for five hours, after which the contents of the beaker were cooled to room temperature. The material in the beaker was a slightly flexible, solid, transparent, resinous plastic.

*Example 3*

8.04 grams (0.0437 mol) of the viscous liquid obtained in the first step of Example 1, above, were placed in a beaker with 2.48 grams (0.0218 mol) of meta-phenylenediamine. The contents of the beaker were heated to 140° C. at atmospheric pressure and held at about this temperature for four hours, then were heated to 200° C. and held at about this temperature for five hours, after which the contents of the beaker were cooled to room temperature. The material in the beaker was a hard, transparent resinous plastic.

We claim:

1. Process for the production of a resinous composition which comprises heating at a temperature in the range 190° C. to 300° C. approximately equimolar proportions of a lower aliphatic glycol and a ketopimelic acid selected from the group consisting of 2-ketopimelic acid and 4-ketopimelic acid until there is produced a fluid polyester mixture containing ketop groups and having an acid number in the range 100 to 145, and then heating the said polyester mixture at a temperature in the range 100° C. to 250° C. with 0.05 to 0.5 mol per keto group of an amine cross-linking agent selected from the group consisting of diethylene triamine, meta-xylylenediamine, and meta-phenylene diamine to cross-link the keto groups of the polyester, thereby to produce a tough, solid thermosetting resin.

2. Composition produced in accordance with claim 1.

3. Process according to claim 1 wherein said lower aliphatic glycol is ethylene glycol and said amine cross-linking agent is meta-xylylenediamine.

4. Process according to claim 1 wherein said glycol is ethylene glycol and said amine cross-linking agent is diethylene triamine.

5. Process according to claim 1 wherein said glycol is ethylene glycol and wherein said amine cross-linking agent is meta-phenylene diamine.

References Cited in the file of this patent

UNITED STATES PATENTS

| | | |
|---|---|---|
| 2,059,850 | Coolidge | Nov. 3, 1936 |
| 2,149,678 | Hovey et al. | Mar. 7, 1939 |
| 2,195,570 | Hovey et al. | Apr. 2, 1940 |
| 2,279,752 | Jacobson | Apr. 14, 1942 |
| 2,730,517 | Vogel | Jan. 10, 1956 |